United States Patent [19]

Hormel et al.

[11] 4,348,613

[45] Sep. 7, 1982

[54] LAMP FAILURE INDICATING CIRCUIT

[75] Inventors: Ronald F. Hormel, Mt. Clemens; Frederick O. R. Miesterfeld, Troy, both of Mich.

[73] Assignee: Chrysler Corporation, Highland Park, Mich.

[21] Appl. No.: 192,652

[22] Filed: Oct. 1, 1980

[51] Int. Cl.[3] .............................................. H05B 37/03

[52] U.S. Cl. ....................................... 315/130; 315/77; 340/642

[58] Field of Search .................. 315/77, 129, 130, 135, 315/136, 92; 340/641-643; 324/20 R, 21, 414

[56] References Cited

U.S. PATENT DOCUMENTS

| | | | |
|---|---|---|---|
| 3,311,779 | 3/1967 | Hartkorn, Jr. | 315/135 |
| 3,995,262 | 11/1976 | France et al. | 315/129 X |

*Primary Examiner*—Eugene R. LaRoche

*Attorney, Agent, or Firm*—Newtson and Dundas

[57] ABSTRACT

A lamp failure indicating circuit particularly useful for automotive vehicle application such as detecting failure of headlamps, stop lamps and/or turn signal lamps. The disclosed circuit embodiments monitor branch circuits each containing a lamp load and comprising an associated transformer. Each transformer comprises two coils disposed on a ferromagnetic torroidal core. One coil of each transformer is connected in the branch circuit of the associated lamp load, the coil and lamp load being in series, and being associated with a means which forms therewith a complete circuit path which is independent of the power supply which energizes the lamp load. The other coils of the transformers are connected in a circuit to which a test signal is applied with the result of the test indicating whether any of the lamps are failed.

3 Claims, 3 Drawing Figures

LAMP FAILURE INDICATING CIRCUIT

BACKGROUND AND SUMMARY OF THE INVENTION

This invention pertains to lamp failure indicating circuits which are particularly useful in automotive vehicle applications for monitoring failure of headlamps, stop lamps, tail lamps, etc.

Various types of lamp failure indicating circuits have heretofore been proposed. Many of these can detect a failure only when a control switch for the lamp is turned on. In other words, these lamp failure indicating circuits cannot detect a failed lamp when the control switch is off. There are also other devices monitoring lamps such as light pipes. Light pipes suffer the same disadvantage as described above in that they cannot indicate a failed lamp when the control switch is off. Also the optic fibers constituting the light pipe are not inexpensive.

The present invention is directed to providing a new and improved lamp failure indicating circuit which can test for lamp failure regardless of whether the control switch for the lamp is on or off; which is cost effective and reliable; and which is particularly useful in automotive applications. The invention does not require the use of memory devices, but rather performs a continuous testing of a monitored lamp load regardless of whether the control switch which controls the lamp load is on or off.

The foregoing, along with additional features, advantages, and benefits of the invention, will be seen in the ensuing description and claims which should be considered in conjunction with the accompanying drawings. The drawings disclose preferred embodiments of the present invention in accordance with the best mode contemplated at the present time for carrying out the invention.

DESCRIPTION OF THE PREFERRED EMBODIMENTS

Figure 1:
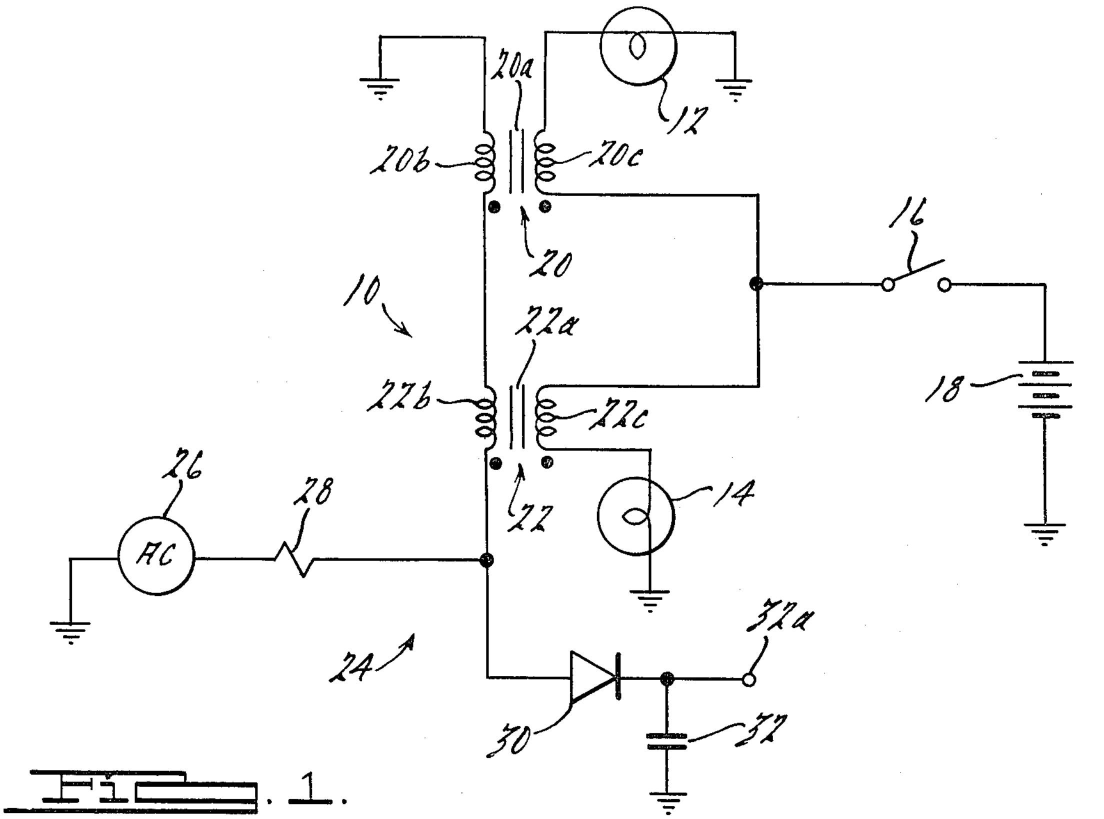
FIG. 1 is an electrical schematic diagram of a lamp failure indicating circuit embodying principles of the present invention.

Looking first to FIG. 1, there is shown a lamp failure indicating circuit 10 embodying principles of the present invention in conjunction with a lamp system, for example, a headlamp system of an automotive vehicle. The illustrated headlamp system is shown to comprise two headlamps 12 and 14, a headlamp switch 16, and a battery 18. (Only a single filament of the headlamp is shown for convenience and it will be appreciated that the invention may be used with single or multiple lamps forming a load.) In the existing vehicle circuit, without the lamp failure indicating circuit according to the invention, the headlamps 12 and 14 are connected as parallel loads on battery 18 via the control switch 16. Thus, when switch 16 closes, current flows from battery 18 through the switch and divides into the two branch circuits containing headlamps 12 and 14 thereby illuminating both headlamps.

The circuit 10 of the present invention is associated with the pre-existing system by interconnection with the individual headlamps 12 and 14. The system 10 comprises a pair of transformers 20, 22 and a test circuit 24. Each transformer comprises a torroidal ferromagnetic core *20a, 22a* and a pair of coils *20b, 20c* and *22b, 22c*, respectively. The coils are disposed on the respective cores in the sense indicated by the dot convention as shown in the drawing. Coil *20c* of transformer 20 is connected in circuit with headlamps 12 as shown and coil *22c* of transformer 22 is connected in circuit with headlamp 14 as shown. In normal operation, the closing of switch 16 will cause current to divide into the two branch circuits to energize headlamps 12 and 14 in the usual manner. The coils *20c, 22c* have essentially no effect on the illumination provided by the lamps. At this point it is important to note that there is complete series circuit from ground through a headlamp and its associated transformer coil and continuing through the other transformer coil and its associated headlamp, and the existence of this complete circuit should be kept in mind in connection with the ensuing description.

The coils *20b, 22b* are also connected in series as shown and it is to this latter circuit that test circuit 24 applies a test signal.

The test circuit 24 comprises an AC voltage source 26, a resistor 28, a rectifying diode 30 and a capacitor 32 connected as shown in association with the circuit. The purpose of test circuit 24 is to apply an AC test signal, which may be of any suitable form such as sinusoidal or square wave, to the series-connected coils *20b, 22b* and to monitor the resultant response. Briefly, if the two branch circuits containing the headlamps are intact, the test circuit will indicate no failure in the form of a low level signal across capacitor 32 as measured at terminal *32a* with respect to ground. This is because the ground paths through the two headlamps in effect short circuit both coils *20c, 22c*. This effect is reflected in the coils *20b, 22b*, in such a way that the coils *20b, 22b* have a very low reflected impedance. Accordingly, the test signal supplied via source 26 through resistor 28 through the series-connected coils *20b, 22b* in this condition results in a low output signal across capacitor 32 meaning that both lamp branch circuits are functionally intact. (It should be noted at this point that any type of a failure in a branch circuit resulting in an open circuit will be detected. The failure could be in the lamp itself or in the wiring or in the connectors of the branch.)

Now, should there be a failure in either branch in such a way as to create an open circuit, then the two coils *20c, 22c* become effectively open circuited. This yields a much higher effective impedance reflected in the two coils *20b, 22b*. A test signal applied now to these coils yields a high level output signal across capacitor 32 and it is this high output signal which gives an indication of a failure in either or both branch circuits. It is expected that usual failure will be in the lamps, and hence the invention is primarily intended to detect lamp failure and provide an indication of this to the operator so that he or she can correct the problem by replacing the defective lamp. Because failures can be detected independently of the condition of the control switch 16, the invention is useful in diagnosing problems in the system. If a failure indication is given, the defect is clearly in a branch circuit. On the other hand, if the control switch is turned on and the headlamp system malfunctions but no failure is indicated by the failure detection system 10, then the fault is not in the branch circuit. Hence, the invention is capable of performing a useful diagnostic function as well.

Figure 2:
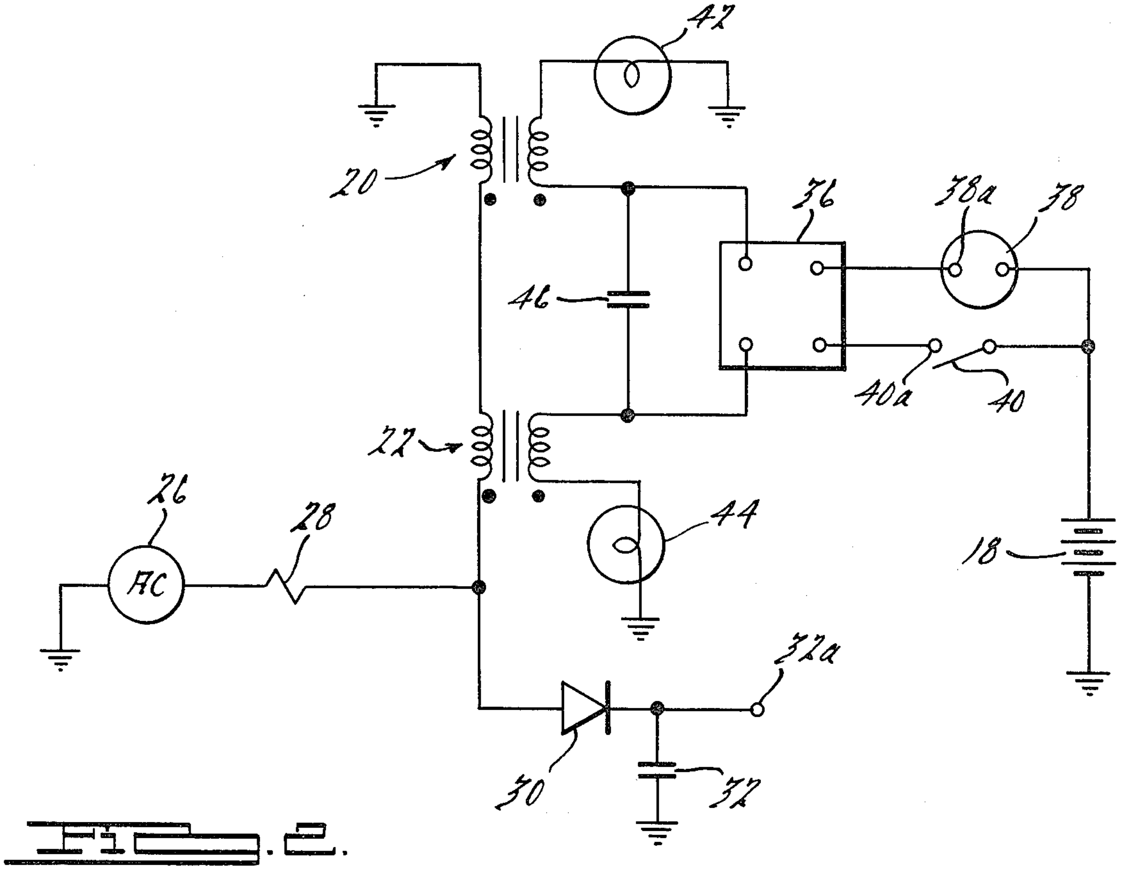
FIG. 2 is an electrical schematic diagram representing another embodiment of the present invention.

From this description, it can be seen that a lamp failure indication function can be implemented without a great deal of complexity, yet with the ability to monitor lamps regardless of whether the control switch for the lamps is open or closed. The output signal across capacitor 32 may be monitored electronically, or as desired, to convey the fact of lamp failure to the vehicle operator, for example via a suitable type warning device. Principles of the invention may be applied to the monitoring of a single lamp or multiple lamps. The embodiment shown in FIG. 2 shows the invention applied to the stop lamps of a vehicle having a configuration where the stop lamps are utilized to perform the turn signal indicating function in addition to the stop indicating function. For this purpose then there is shown a turn signal switch 36, a turn signal flasher 38 and a stop lamp switch 40 connected in circuit as shown with the lamps 42 and 44 being the combined stop and turn signal lamps at each side of the vehicle. The remaining circuit components in FIG. 2 correspond to the like numbered components in FIG. 1.

When the turn signal switch is in the Off position, each lamp circuit is directly connected through the turn signal switch to the load terminal 40*a* of the stop lamp switch. Thus, as the stop lamp switch closes and opens, the lamps are correspondingly energized and deenergized. When the turn signal is actuated to indicate a turn, the corresponding lamp circuit is effectively disconnected from terminal 40*a* and instead effectively connected to the load terminal 38*a* of the turn signal flasher. Under this condition, the turn signal flasher will intermittently energize the selected lamp, while the other lamp remains under the control of the stop lamp switch.

Whenever the selective disconnection of one of the lamps from the stop lamp switch occurs due to the turn signal switch being operated, the two lamp branch circuits no longer form the complete circuit whose importance was explained above for purposes of failure detection. This means that the series circuit which would otherwise exist from ground through one of the lamps and its associated transformer coil, and continuing through the corresponding coil of the other transformer and its associated lamp back to ground is interrupted when the turn signal switch is operated. In order to maintain a complete circuit for purposes of monitoring lamp failure, a capacitor 46 is also connected in circuit as illustrated. Due to the AC nature of the test signal the capacitor 46 constitutes a short circuit between two lamp circuit branches and thereby allows a failure in the branches to still be detected while not impairing the stop lamp or turn signal functions. Briefly, capacitor 46 is of relatively small capacity so that when the stop lamp switch is closed and the turn signal switch is actuated to select one of the lamps for flashing, it rapidly charges when the turn signal flasher contacts open so as to block current flow from the stop lamp switch to the lamp not selected by the turn signal switch. Thus, the invention may be used to advantage in applications where the lamps are continuously or intermittently selectively operated and without regard to whether the control switches are closed or open.

Figure 3:
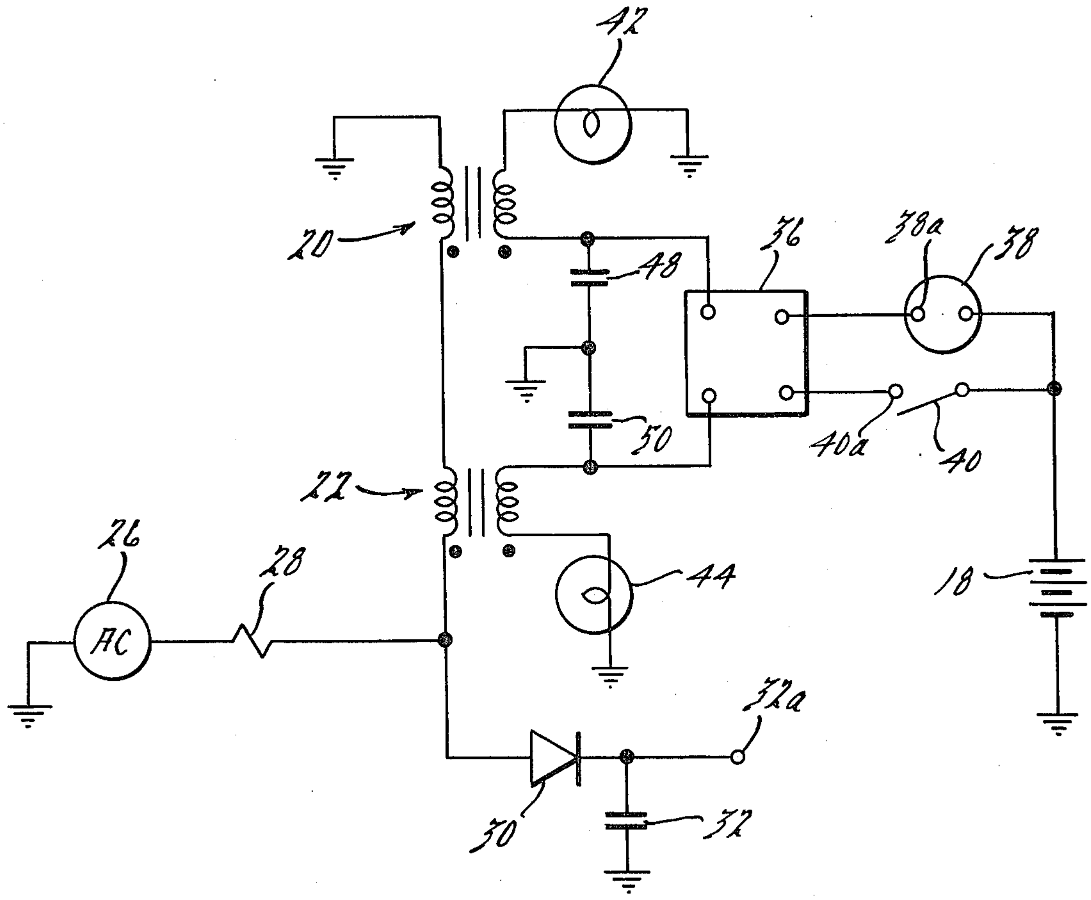
FIG. 3 is an electrical schematic diagram representing still another embodiment.

FIG. 3 illustrates a further embodiment similar to FIG. 2 with like components in the two figures being identified by like numerals. The difference between FIG. 2 and FIG. 3 is that the capacitor 46 of FIG. 2 is removed and replaced by the two capacitors 48, 50 as shown. One capacitor is associated with one lamp, and the other with the other lamp. Thus, for each lamp branch, the associated capacitor forms the complete circuit which complete circuit does not include the power source and the control switch or switches. If either lamp fails the corresponding reflected impedance in corresponding transformer becomes large enough to develop a failure indication signal across capacitor 32. So long as the lamps remain intact, the complete circuits formed by the capacitors 48, 50 result in lower reflected impedances in the transformers so that no failure signal is given across capacitor 32.

While preferred embodiments have been disclosed, it will be appreciated that the invention in its broader aspects contemplates that its principles may be applied to other embodiments. Details for constructing implementations of the invention may be developed using conventional engineering formulas and computational techniques:

What is claimed is:

1. In a lamp circuit comprising a source of energizing potential, a control switch and a pair of branch circuits each containing a corresponding lamp load which are selectively connected to the power source via the switch, a failure indicating circuit in association with said lamp circuit comprising:

a pair of transformers each comprising a pair of coils;

means connecting one coil of each transformer in a corresponding one of the branch circuits and the two branch circuits together to form a complete circuit which is independent of the power source and the control switch;

means connecting the other coil of each transformer in series with each other;

and means applying a test signal to the last mentioned series circuit and monitoring its response whereby to provide an indication of a failure in either or both branch circuits.

2. A failure indicating circuit for circuit branches containing lamps which branches are adapted to be energized from a switched source of energizing potential, comprising:

a firt lamp load;

a second lamp load;

a first transformer comprising a pair of coils;

a second transformer comprising a pair of coils;

means connecting the two lamp loads and one of the coils of each transformer in a complete circuit independent of the switched source of energizing potential;

means connecting the other coil of each transformer in another series circuit;

means applying to the last mentioned series circuit a test signal and monitoring its response whereby to provide an indication of a failure in either or both of the two branches containing the two lamp loads.

3. A lamp failure indicating circuit for producing failure indicating signals in accordance with the failure of a lamp or lamps in the monitored circuit independent of the energized or de-energized condition of the light switch comprising:

test signal means communicating with the monitored circuit;

transformer means passing said test signal into communication with each monitored branch of said monitored circuit;

connection means providing for the series connection of all primary coils of each transformer means to said test signal means;

further connection means providing for the series connection and detection of all secondary coils of each transformer means with each monitored branch of said monitored circuit; and detector means indicating the existence of a failure when the failure is in any one of the monitored branches or when the failure is in all of the monitored branches.

* * * * *